United States Patent [19]

Ishino et al.

[11] Patent Number: 4,686,895

[45] Date of Patent: Aug. 18, 1987

[54] APPARATUS FOR PRODUCING BOILED EGGS

[75] Inventors: Yuuji Ishino; Hitoshi Takai; Toshihiro Yoshida, all of Matsuto, Japan

[73] Assignee: Ishino Seisakujo Co., Ltd., Kanazawa, Japan

[21] Appl. No.: 806,704

[22] Filed: Dec. 9, 1985

[30] Foreign Application Priority Data

Dec. 11, 1984 [JP] Japan .................. 59-261037

[51] Int. Cl.$^4$ ............................. A47J 29/00
[52] U.S. Cl. .................. 99/440; 99/443 C; 99/447; 99/451; 99/427; 198/779
[58] Field of Search .............. 99/440, 443 C, 447, 99/448, 451, 427, 352; 426/523; 198/387, 779

[56] References Cited

U.S. PATENT DOCUMENTS 3,120,889  2/1964  Willsey .................. 198/779 X
3,991,665  11/1976  Lang-Ree .................. 99/440 X Primary Examiner—Timothy F. Simone
Attorney, Agent, or Firm—Rodman & Rodman

[57] ABSTRACT

A method of and an apparatus for producing boiled eggs uniformly heats and solidifies each of the eggs. As the heating means, infrared and/or far infrared rays is adopted. The eggs are supported by pairs of conveyor rolls having recesses. The respective pairs of conveyor rolls are rotated in the same rotating directions, whereby the eggs supported thereon are turned about the axes thereof, so that the whole surfaces of the eggs can be uniformly irradiated by the infrared and/or the far infrared rays.

6 Claims, 4 Drawing Figures

APPARATUS FOR PRODUCING BOILED EGGS

BACKGROUND OF THE INVENTION (a) Field of the Industrial Utilization

This invention relates to a method of producing boiled eggs and an apparatus therefor, and more particularly to a dry type heating method of producing eggs in the hard boiled state and soft boiled state and an apparatus therefor.

(b) The Prior Art

As has been well known, to produce boiled eggs, the eggs are heated in water. However, depending upon whether hard boiled eggs or soft boiled eggs are desired, it is necessary to adjust the temperature and the time for heating the eggs.

In order to produce a nice looking boiled egg with the yolk being positioned at the center of its albumen when the egg is cut crosswise, it is usually necessary to suitably turn the egg while it is being heated to obtain uniform heating.

For example, when boiled eggs are needed in small quantities, the production of the boiled eggs is easily carried out because the eggs in the hot water can be easily turned. However, when boiled eggs are needed in large quantities such as for commercial purposes, it is difficult to turn the eggs without damage when there are large quantities of the eggs in the hot water. Consequently, the yolks of the eggs become positioned more to one side than the other, so that the boiled eggs, cannot be obtained with the yolk positioned at the center.

Moreover, when the boiled eggs are produced according to the known method of heating the eggs, a batch system cannot be selected because of the method of heating such eggs. Consequently, by using the conventional method of producing the boiled eggs, a worker is endangered by containers containing a large amount of hot water that must be handled by the worker, in order to avoid abrupt heating of the eggs. This danger is continuous, especially when heating of eggs be repeated as often as necessary, to control high fuel costs.

Furthermore, cracks tend to be caused to the egg shells. Even when the positions of the eggs are fixed by forming frames and the like, a large scale facility becomes necessary, making it difficult to turn the eggs, whereby the yolks lean to one side, thus presenting the disadvantages of such an operation.

OBJECTS AND SUMMARY OF THE INVENTION

In consequence, the present invention has been developed to obviate the above-described disadvantages of the prior art and has as its object the provision of a completely novel egg heating method wherein boiled eggs are produced continuously and in large quantities without heating the eggs in water as in the conventional case and an apparatus therefor.

The present invention resides in a method of producing of boiled eggs wherein the eggs are turned on their axes under the irradiation of a light having a wave length within a wave length region of infrared rays and/or far infrared rays for heating and solidifying the eggs.

Furthermore, the present invention resides in a boiled egg producing apparatus wherein:

the apparatus comprises a chain conveyor path having chains arranged in two rows, hearing portions provided on extensions of at least one set of pins adjacent to each other of the chains, tubular members rotatably inserted at opposite ends thereof with the bearing portions and including a plurality of circularly arcuate grooves each having a width slightly larger than an egg and extending in the circumferential direction of the tubular member, and support rails arranged in two rows opposed to opposite ends of the tubular members and having rotatably mounted thereon the tubular members; and a body radiating infrared rays and/or far infrared rays and provided upwardly of the chain conveyor path.

The reason why the infrared rays or the far infrared rays are used in the present invention is because the infrared rays or the far infrared rays are excellent in transmittance through the egg shells, whereby the infrared rays or the far infrared rays directly heat yolks and albumens in the egg shells, so that the eggs can be efficiently heated for a very short period of time. As the light having the wave length within the region of the wave length of the infrared rays or the far infrared rays which is used, the lights containing the infrared rays or the far infrared rays within the region of the wave length of 1 $\mu$m to 25 $\mu$m, particularly, 2.5 $\mu$m to 10 $\mu$m are preferable because the lights contain a moisture absorptive wave length zone and a protein absorptive zone.

Consequently, the body radiating the infrared rays or the far infrared rays used in the present invention radiates the light having the wave length within the region of the wave length of the infrared rays or the far infrared rays, and particularly, radiates the light within the region of the wave length of 1 $\mu$m to 25 $\mu$m, particularly, 2.5 $\mu$m to 10 $\mu$m.

Furthermore, according to the present invention, adjustment of the value of heating the eggs can be easily performed by the adjustment of a distance between the eggs and the body radiating the infrared rays or the body radiating the far infrared rays.

In order to adjust the intensity of the infrared rays or the far infrared rays as described above, it is preferable that the body radiating the infrared rays or the far infrared rays is formed in a manner to be movable relative to the eggs, and it is also preferable that an infrared ray heater, a far infrared ray heater or the like is formed in such a manner that the voltage can be regulated.

In the boiled egg producing apparatus according to the present invention, to turn the eggs constantly while the eggs are preventing from contacting one another, the eggs are supported by the tubular members during turning and conveying of the eggs. In this case, in order for the eggs to be stably supported at predetermined positions of the respective tubular members contiguously disposed in parallel to one another, it is preferable to form grooves fitted to contours of the eggs, the grooves extending entirely in the circumferential direction of the tubular members.

It is preferable that the dimensions of each of the grooves are determined such that the egg is not rocked so as to be damaged in the groove, the dimensions being slightly larger than that of the egg, or less.

According to the present invention, the infrared and/or the far infrared rays is used to heat the eggs, so that the boiled eggs similar to those made in the conventional manner can be obtained in a short period of time. The reason is that, by the irradiation of these infrared rays, the far infrared rays can reach the central portions of the eggs through the egg shells, so that the far infrared rays can heat the central portions of the eggs, not only the outer peripheral portions of the eggs. In contrast thereto, when the heat radiation rays smaller in wave length than the infrared rays are used, the surface portions of the eggs are excessively heated as compared with the interior of the eggs. Heat thus accumulates around the egg shells, whereby steam tends to be generated and the egg shells are liable to be broken, so that a relatively long period of time is required for obtaining the boiled eggs, making this approach impractical.

In contrast thereto, according to the present invention, the eggs are heated by the infrared rays through the egg shells, whereby pore portions of the egg shells and an internal film are fused to each other to be airtight, so that contamination can be avoided.

More detailed description will hereunder be given of the present invention with reference to the accompanying drawings. However, the specific form described herein is a mere example, and, the present invention need not necessarily be limited to such specific form.

DETAILED DESCRIPTION OF THE INVENTION

Figure 1A:
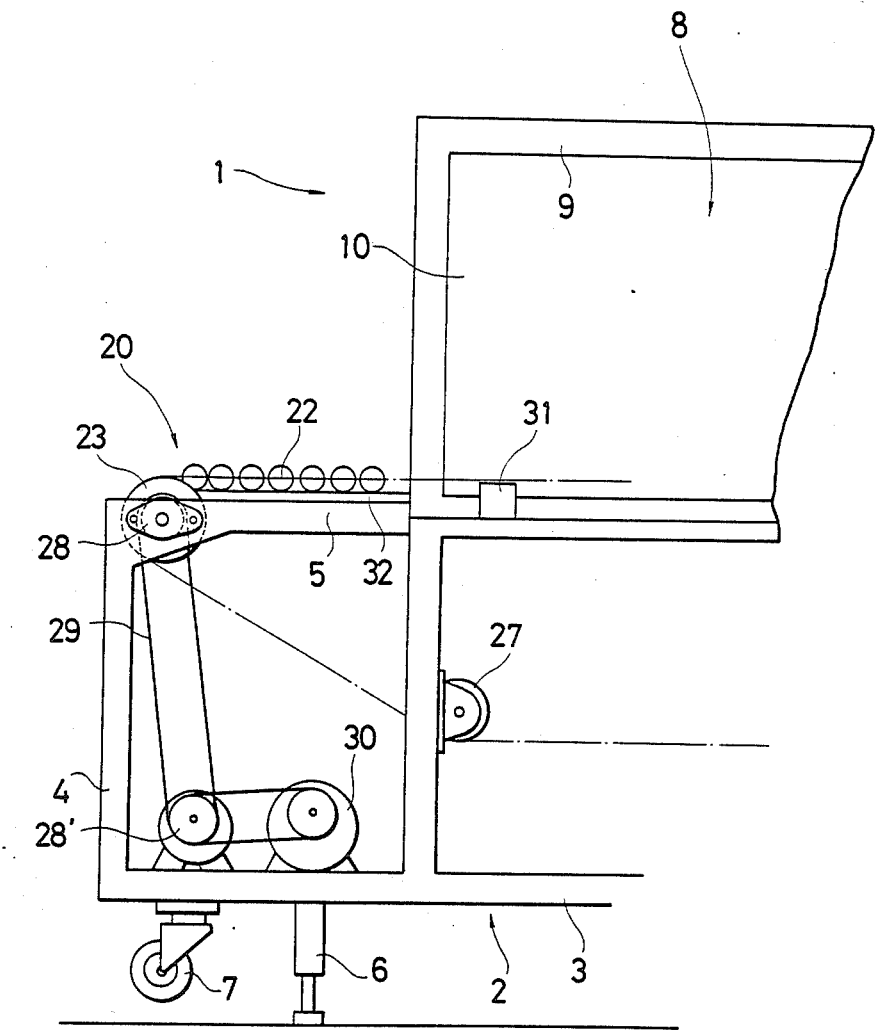
FIGS. 1a and 1b are partial side views sectionally showing the end portion of the boiled egg producing apparatus embodying the present invention, respectively.

A boiled egg producing apparatus 1 has a support frame 2 which is constituted by a rectangular frame body 3, four columnar members 4 vertically upwardly extending from four corner portions of the frame body 3 and beam members 5 mounted across the top portions of two columnar members 4 positioned on opposite sides of the frame body 3 in the longitudinal direction thereof. As shown, hydraulically retractable legs 6 and wheels 7 are secured to suitable portions of the bottom of the frame body 3.

When the boiled egg producing apparatus 1 is about to be moved, the legs 6 are retracted, whereby the apparatus 1 can be supported by the wheels 7, so that the apparatus 1 can be moved to a predetermined position. After the apparatus 1 is moved to the predetermined position, the legs 6 are extended as shown, whereby the wheels 7 are elevated from the floor surface, so that the apparatus 1 can be stably located at the predetermined position.

A heating region is provided upwardly of the support frame 2 of the apparatus 1, and a heating housing 8 is provided in this heating region. The heating housing 8 is constituted by a plurality of rectangular frame bodies 9 which are supported on the beam members 5 of the support frame 2, and further, disposed in the longitudinal direction of the support frame 2. Provided at opposite sides of each of the frame bodies 9 are panels 10 which can be opened. Provided on the top surface of each of the frame bodies 9 is a fixed panel 11, whereby the tunnel-shaped heating housing 8 opening at the opposite end portions thereof in the longitudinal direction thereof is formed.

Provided in each of the frame bodies 9 is a heat radiation source 12 which is constituted by an infrared radiating body 13 for mainly radiating a light of a wave length within the wave length of 1 to 25 m, a reflector 14 provided upwardly of the infrared radiating body 13, and a support member 15 supporting these both elements. As shown, the support member 15 is vertically movably suspended by chains 16, for example, in each of the frame bodies 9 from the top portion thereof.

Although not shown in detail, the chains 16 are raised or lowered by an external force, so that the support member 15 can be vertically moved. To stably perform the above described vertical movement of the support member 15, a guide bar 17 is suspended from the top portion of each of the frame bodies 9, and this guide bar 17 extends through a guide hole 18 formed in the support member 15. Provided on the upper fixed panel 11 of each of the frame bodies 9 is an exhaust blower 19, so that the atmospheric temperature in the heating housing 8 can be adjusted.

The boiled egg producing apparatus 1 has conveying means for passing the eggs, with the eggs being turned, through a heating region, i.e. the heating housing 8. This conveying means 20 is constituted by a pair of endless chain elements 21 and a multiplicity of parallel roller members 22 rotatably stretched across the endless chain elements 21, for supporting the eggs.

Figure 1B:
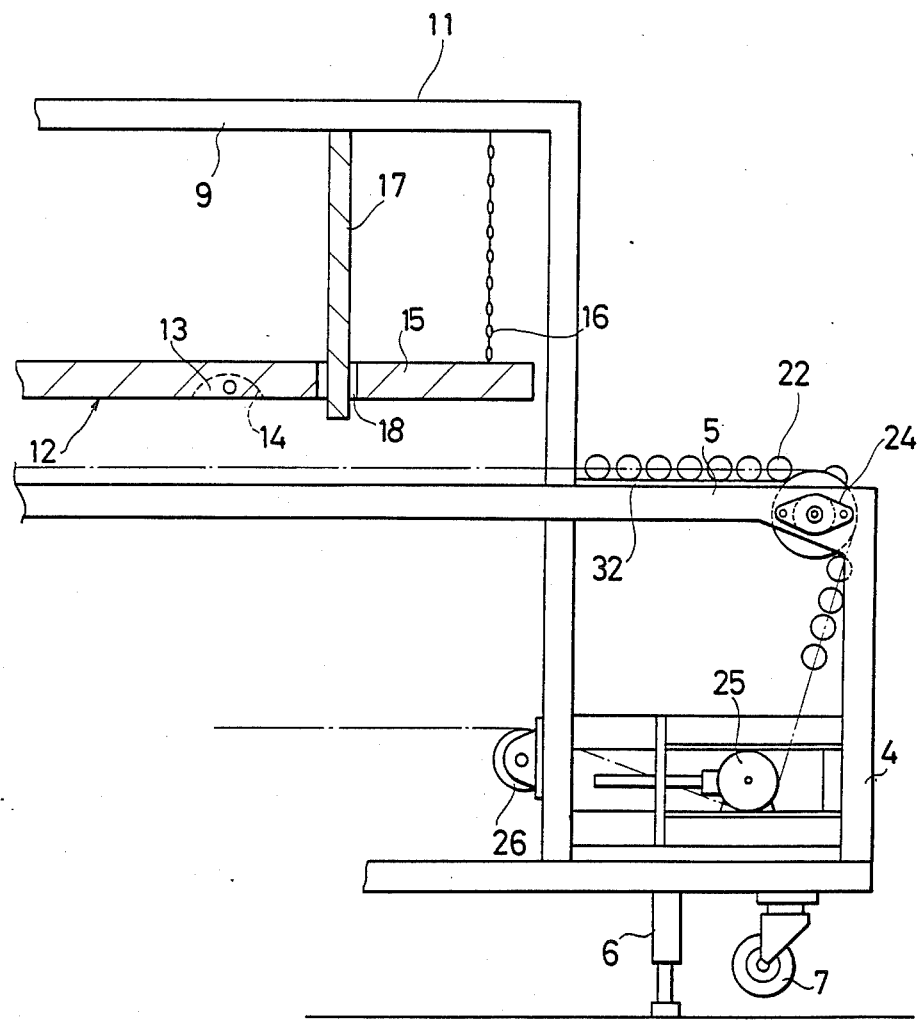
Figure 2:
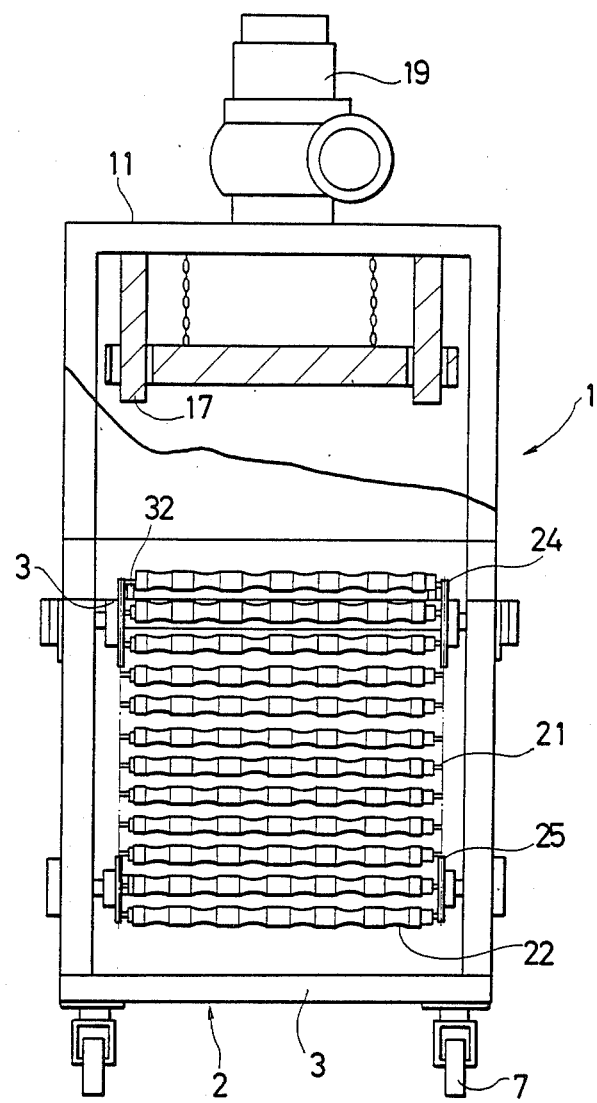
FIG. 2 is a front view sectionally showing a portion thereof.

The pair of endless chain elements 21 are guided around pairs of gears 23 and 24 rotatably supported at opposite ends of the two beam members 5 of the support frame 2, respectively, and three pairs of gears 25, 26 and 27, which are disposed at positions downwardly of the beam members 5 of the support frame 2 and yet upwardly of the frame body 3. Additionally, in FIGS. 1a and 1b, the gears 23, 24, 25, 26 and 27 only on one side out of the respective pairs are shown.

As shown in FIG. 1, provided on a portion to the extreme left of the frame body 3 of the support frame 2 is a driving wheel 28 being coaxial with the driving gears 23 for driving the pair of endless chain elements 21. The driving wheel 28 is connected to a prime mover, i.e. an electric motor 30 through a speed reducer 28' and a driving belt 29. The pair of driving gears 23 are rotatably driven through this driving belt 29, whereby the pair of endless chain elements 21 is driven in the clockwise direction for example in FIG. 1, so that the multiplicity of parallel roller members 22 rotatably stretched across the pairs of endless chain elements 21 can be successively passed through the heating region, i.e. the heating housing 8.

Each of the parallel roller members 22 is constituted, for example, by a steel pipe 33, a plurality of roller pieces 34 made of aluminum and coupled onto the pipe 33, and a heat-resistant urethane rubber layer 35 coated on these roller pieces 34, for example. Additionally, as indicated by reference numeral 36 in FIG. 3, the roller pieces 34 are preferably connected to each other by a tenon joint.

Provided at opposite ends of each of the parallel roller members 22 are bearings 37 which rotatably support pins 38 projecting from the endless chain elements 21, whereby the respective parallel roller members 22 are rotatably extended across the pair of endless chain elements 21. Furthermore, in order for the eggs to be stably supported at the predetermined positions on the parallel roller members 22, it is preferable to form grooves 39 on the peripheral portions of the respective parallel roller members 22.

Figure 3:
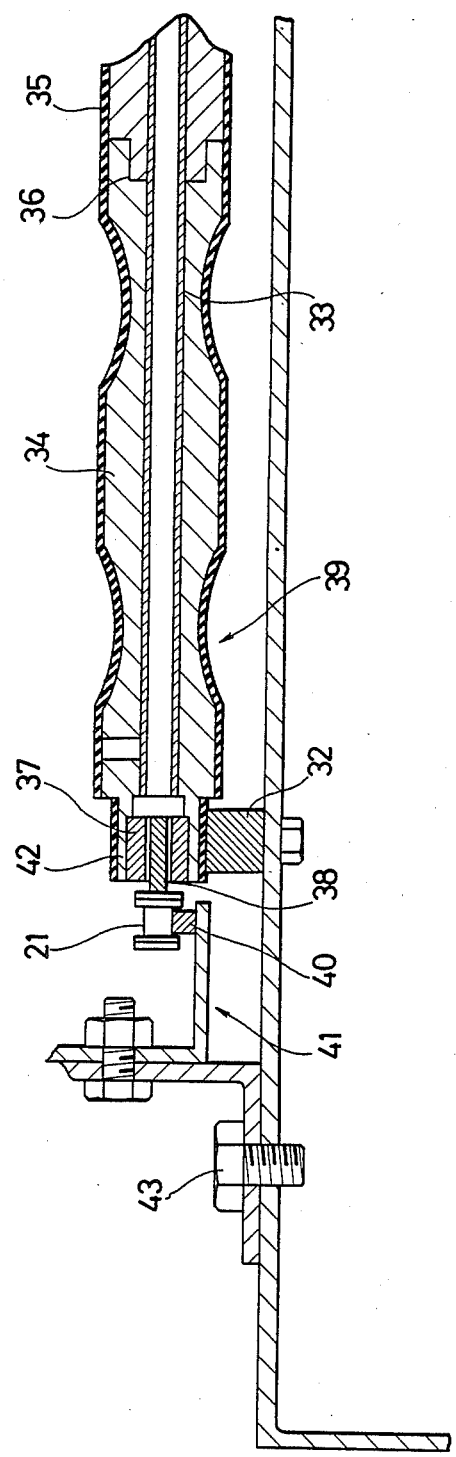
FIG. 3 is a sectional view showing one side of the tubular member used in working the present invention.

As detailedly shown in FIG. 3, a bottom heat shield plate is disposed downwardly of a running path of the parallel roller members 22 in the heating region, i.e. the heating housing 8, whereby the far infrared rays emitted from the heat radiation source 12 is prevented from leaking through the bottom of the heating housing 8.

As shown, guide rails 40 for the endless chain elements 21 are provided along opposite sides of the bottom heat shield plate. There guide rails 40 are supported by suitable support beam members 41. The running of the endless chain elements 21 is stabilized by the guide rails 40, so that the parallel roller members 22 can convey the eggs supported thereon in a stabilized manner.

Furthermore, as shown in FIG. 3, rail members 32 other than the above ones are laid along the guide rails 40 in a manner to be engageable with opposite end portions 42 of the parallel roller members 22, whereby, when running in the heating housing 8, the parallel roller members 22 are rotated and moved on the rail members 40. Due to the above-described rotation of the parallel roller members 22, the eggs supported thereon are passed through the heating housing 8, while turning.

Subsequently, to operate the above-described boiled egg producing apparatus 1, firstly, at the inlet portion of the heating housing 8 (namely, to the left in FIG. 1), eggs are disposed between the grooves 39 of the parallel roller members 22 being adjacent to each other and supported thereby. Then, the eggs supported on the parallel roller members 22 are conveyed in the heating housing 8, where the eggs are irradiated by the far infrared rays from the heat radiation source 12. At this time, the eggs are constantly turned on the parallel roller members 22.

After being subjected to the irradiation by the far infrared rays of a predetermined dose, the eggs are cooked as the so-called boiled eggs, and these boiled eggs are carried out from an outlet portion of the heating housing 8 (namely, to the right in FIG. 1). As previously mentioned, the heat radiation source 12 is moveable vertically, so that the irradiation dose applied to the eggs by the far infrared rays can be regulated.

More specifically, when the heat radiation source 12 is moved upwardly, the irradiation dose given to the eggs by the far infrared rays is decreased. On the contrary, when the heat radiation source 12 is moved downwardly, the irradiation dose given to the eggs by the far infrared rays is increased. The above-described adjustment makes it possible to obtain hard boiled eggs or soft boiled eggs, for example.

In order to obtain uniform boiled eggs, it is necessary to maintain the atmospheric temperature at a constant level in the heating housing 8. Maintaining of the atmospheric temperature at a constant level is carried out by the exhaust blower 19.

The infrared ray radiating bodies used in this embodiment include well-known infrared radiating bodies such as a silicon carbide rod, a tungsten lamp and an iodine lamp. Furthermore, the far infrared ray radiating bodies include well known far infrared ray radiating bodies such as Zirconium ceramics, Titanium ceramics, Aluminum ceramics and -spondumene series ceramics.

EFFECTS OF THE INVENTION

As apparent from the foregoing, according to the present invention, boiled eggs can be produced without using hot water. Therefore, the danger when hot water is handled as in the conventional case can be avoided.

Furthermore, according to the present invention, the eggs are continuously turned, whereby the yolks do not become positioned to one side. Thus in each of the boiled eggs, the yolk is positioned at the center. Moreover the hard boiled eggs can be continuously, produced in large quantities.

Further, it is easy to adjust the position of radiating the infrared rays or the far infrared rays relative to the eggs, so that the hard boiled eggs and soft boiled eggs can be easily produced.

Furthermore, according to the present invention, the atmospheric temperature in the heating housing can be maintained at the predetermined level. Moreover, occurrence of the directional property due to heating, etc. is prevented by the rotation, the boiled eggs having uniform quality can be produced in large quantities. As described above, a uniform heating atmosphere stands and the eggs are not brought into contact with one another, so that the decrease in the yield due to the damaging of egg shells and the like can be avoided.

Moreover, according to the present invention, the infrared rays and the far infrared rays are used for heating the eggs, whereby the pores of the egg shells are fully closed so as to be air-tight. Thus a high degree of freshness of the eggs can be maintained since the eggs do not easily decompose.

As has been described hereinabove, the present invention, being superior to the conventional method of producing the boiled eggs and apparatus therefor, is highly influential to others in the industry.

What is claimed is:

1. An apparatus for producing boiled eggs, comprising:
    a housing;
    endless chains guided around a driving sprocket and a guiding sprocket, having at least portions of upper running paths and lower running paths thereof positioned in said housing to form a circulating path between said upper and lower running paths thereof and arranged in two rows in parallel to each other;
    a multiplicity of tubular members each formed at opposite ends thereof with bearing portions and having said opposing bearing portions rotatably supporting pin extensions of said endless chains opposed thereto and provided between said endless chains in two rows to form a chain conveyor;
    rail members being in contact with the undersurfaces of end portions of respective tubular members positioned in the upper running paths to support said tubular members;
    a radiator of infrared rays provided upwardly of the rows of said tubular members positioned in said upper running paths in said housing; and
    an exhaust gas blower provided in said housing; wherein grooves being circularly arcuate in cross section and each having a width slightly larger than an egg at the largest are formed on the outer peripheral surfaces of said tubular members in the circumferential direction of said tubular members and egg holding surfaces are formed by the opposing circularly arcuate grooves of said tubular members disposed adjacent to each other.

2. An apparatus for producing boiled eggs comprising, conveyor means for supporting and moving a plurality of eggs in a first direction, in a predetermined arrangement of columns and rows, infrared heating means including a heat radiation source provided over a portion of said conveyer means to heat said eggs as said eggs move in said first direction past said heating means, said heat radiation source being adjustable in height with respect to said conveyor means to selectively position said heat radiation source at a first predetermined height over said eggs to heat said eggs to a hard boiled state during movement of said eggs past said heating means, said heat radiation source being positionable to a second predetermined height over said eggs to heat said eggs to a soft boiled state during movement of said eggs past said heating means.

3. The apparatus as claimed in claim 2 wherein said conveyor means include a plurality of spaced and parallel elongated rollers having an axis of rotation perpendicular to said first direction of movement of said eggs, each of said rollers having a predetermined plurality of registering egg grooves formed in the periphery of said rollers such that each space between corresponding egg grooves of adjacent rollers, accommodate an egg.

4. The apparatus as claimed in claim 3 wherein each of said rollers have a peripheral surface layer of non-metallic material having a relatively high coefficient of friction.

5. The apparatus as claimed in claim 4 wherein said surface layer is formed of rubber.

6. The apparatus as claimed in claim 5 wherein said rollers have opposite ends supported on a fixed rail, and said rollers are rotatably pivoted on pins such that as said conveyor moves in said first direction said rollers frictionally engage said rails to effect rotation of said rollers about said pins to cause rotation of said eggs on said conveyor as said conveyor moves in said first direction.

* * * * *